United States Patent [19]

Lim

[11] Patent Number: 5,789,241

[45] Date of Patent: Aug. 4, 1998

[54] GARBAGE DECOMPOSING APPARATUS HAVING BLOWER FORMING AN AIR CURTAIN BLOCKING ESCAPE OF ODORS

[75] Inventor: Jae Han Lim, Suwon, Rep. of Korea

[73] Assignee: Samsung Electronics Co., Ltd., Suwon, Rep. of Korea

[21] Appl. No.: 629,761

[22] Filed: Apr. 9, 1996

[30] Foreign Application Priority Data

Oct. 4, 1995 [KR] Rep. of Korea ............ 95-27727

[51] Int. Cl.⁶ .................................................. C12M 1/06
[52] U.S. Cl. ............................ 435/286.6; 435/290.2; 220/908
[58] Field of Search ............... 435/290.1, 290.2, 435/290.3, 290.4, 286.6; 71/9, 8; 220/908, 913

[56] References Cited

U.S. PATENT DOCUMENTS

| | | | |
|---|---|---|---|
| 3,618,734 | 11/1971 | Khan | 435/809 |
| 4,193,354 | 3/1980 | Woods | 110/212 |
| 4,499,614 | 2/1985 | Yeagley | 435/290.2 |
| 4,709,426 | 12/1987 | Godwin, Jr. | 4/300.3 |
| 4,902,482 | 2/1990 | Faust | 422/121 |
| 5,042,456 | 8/1991 | Cote | 126/299 |

FOREIGN PATENT DOCUMENTS

| | | | |
|---|---|---|---|
| 3-093688 | 4/1991 | Japan | 435/290.2 |
| 7-204613 | 8/1995 | Japan | |

*Primary Examiner*—William H. Beisner
*Attorney, Agent, or Firm*—Burns, Doane, Swecker & Mathis, L.L.P.

[57] ABSTRACT

A vessel for decomposing garbage includes a garbage input port and a stirrer for stirring the garbage. A lid is provided for opening and closing the garbage input port. A hollow pipe is connected to a blower and is disposed within the vessel for establishing an air curtain that prevents the escape of odiferous gas through the garbage input port. The blower is automatically actuated in response to an opening of the lid.

2 Claims, 2 Drawing Sheets

GARBAGE DECOMPOSING APPARATUS HAVING BLOWER FORMING AN AIR CURTAIN BLOCKING ESCAPE OF ODORS

BACKGROUND ART

The present invention relates to an apparatus for decomposing garbage, more particularly to a garbage decomposing apparatus.

Generally, a garbage decomposing apparatus has a lid for opening and shutting an input port used for depositing garbage the input port formed in the upper portion of a decomposing vessel. In such an apparatus, an offensive odor generated in decomposing garbage leaks out through the input port, whenever a user opens the lid to deposit garbage into the apparatus, thus to pollute the surroundings and give an unpleasant feeling to the user.

An apparatus for decomposing garbage having an annular pipe installed at the upper edge of a decomposing vessel is disclosed in Japanese Utility Model Application Laid-Open Publication No. 61-67854. The annular pipe is formed with a number of perforated holes opened toward the center of a hopper to supply and inject water through the holes to wash down garbage on the inner wall of the hopper. However, the annular pipe does not serve for blocking outflow of the offensive gas from the vessel at all.

Accordingly, it is an object of the present invention to block the outflow of gas through an open lid of a garbage decomposing vessel.

SUMMARY OF THE INVENTION

According to the invention, there is provided a garbage decomposing apparatus including a vessel for receiving garbage and a stirrer for stirring the garbage in the vessel, comprising a lid for opening and shutting a garbage input port provided in an upper portion of said vessel; and a blower actuable in response to an opening of said lid for forming an air-flow layer in said vessel to block an outflow of gas formed in said vessel through said lid in open state.

The blowing means may be connected to a pipe formed with a number of perforations for blowing air into said pipe. Here, the pipe is annually disposed along the inner wall of said vessel to form said air-flow layer having an air-flow directed to a center area from the circumference of the vessel.

BRIEF DESCRIPTION OF THE DRAWINGS

Hereinafter the present invention will be explained in detail with reference to the attached drawings.

DETAILED DESCRIPTION OF THE PREFERRED EMBODIMENT

Figure 1:
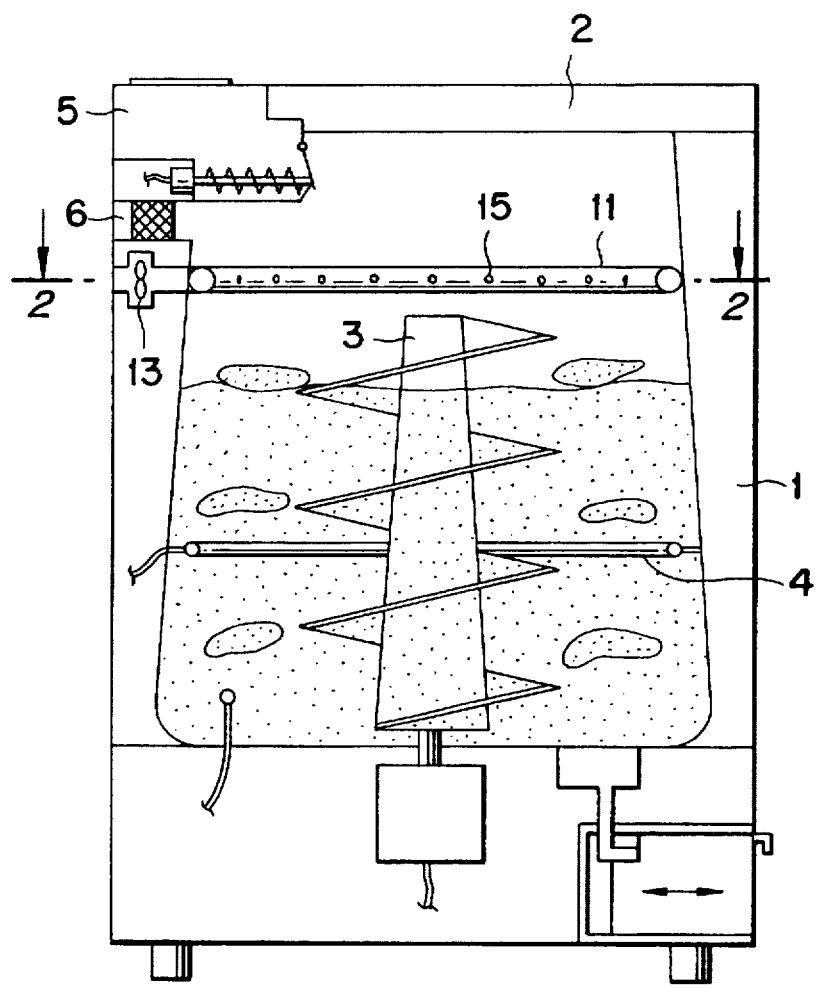
FIG. 1 is a sectional vertical view of a garbage decomposing apparatus according to the present invention.
Figure 2:
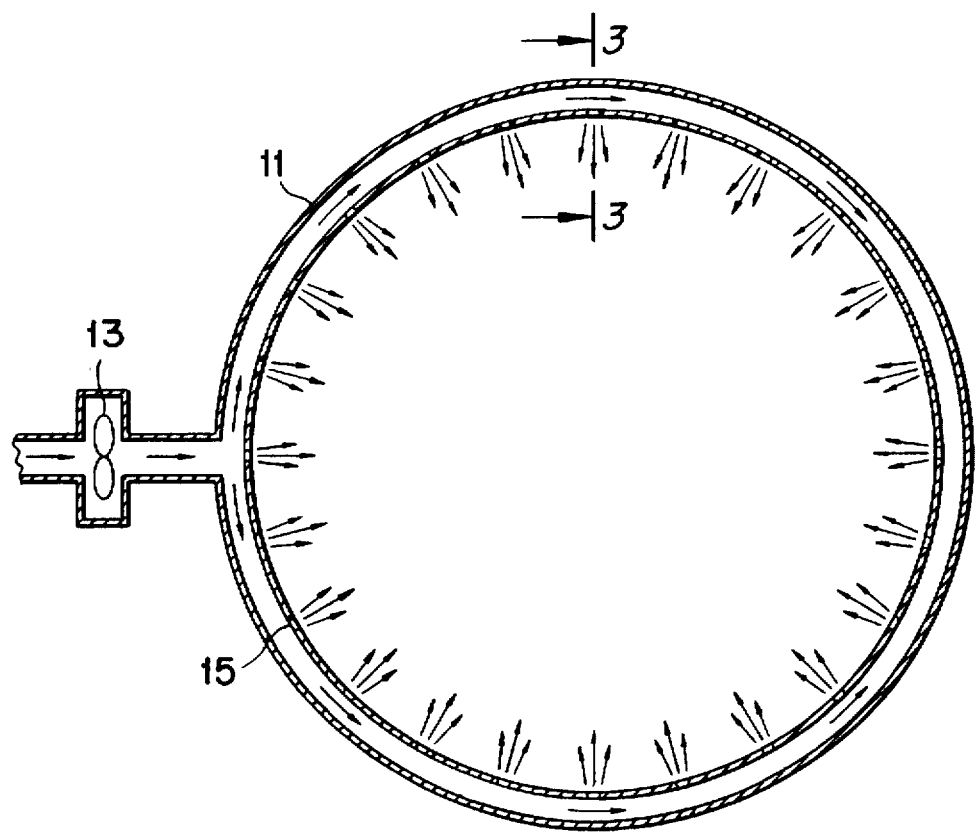
FIG. 2 is a sectional view taken along line 2—2 in FIG. 1.
Figure 3:
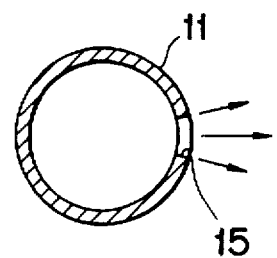
FIG. 3 is a sectional view taken along line 3—3 in FIG. 2.

FIG. 1 shows a sectional view of a garbage decomposing apparatus according to the present invention. As shown in the drawing, a decomposing vessel 1 for receiving garbage to be decomposed is provided with a lid 2 for opening and shutting a garbage input port formed in the upper portion of the vessel 1. A rotating agitator 3 for stirring the garbage is disposed in the vessel 1. A container 5 for receiving and supplying powdered preparations, consisting of microorganism for biological decomposition of the garbage and pulverized wood for promoting the biological decomposition, is also disposed in the upper portion of the decomposing vessel 1. Within the decomposing vessel 1, there is provided a heater 4 for heating the garbage. A mechanism is installed adjacent to the lid 2 in the upper portion of the vessel 1 for establishing an air flow layer.

That mechanism includes an annular pipe 11 formed with a number of spaced perforations 15. The pipe 11 is installed along the inner wall in the upper portion of the vessel 1. The perforations 15 are opened toward the center of the vessel 1. At a side of the pipe 11, there is provided a blower 13 for blowing air into the pipe 11.

When a user opens the lid 2 to deposit garbage into the vessel 1, a switch, which is not shown in the drawings, simultaneously operates the blower 13 to blow air into the pipe 11. The air is injected toward the center of the vessel 1 from the perforated holes 15 of the pipe 11 to form an air-flow layer, namely air curtain. The air-flow layer blocks an outflow of gas form the vessel 1 and thereby the offensive odor of the gas is prevented from leaking out through the input port.

In the described and illustrated example, the air-flow layer is formed to converge at the center of the vessel 1, but the pipe and the perforations thereof could instead be arranged to form an air-flow layer to converge at a gas discharge port 6, leading to an outside area provided on the wall of the vessel, thereby to block an outflow of the gas through the input port as well as to promote a discharging of the offensive gas through the discharge port.

As described above, the garbage decomposing apparatus according the the invention prevents effectively odor generated in decomposing garbage from outflowing when the lid is opened.

What is claimed is:

1. A garbage decomposing apparatus including a vessel for receiving garbage and a stirrer for stirring the garbage in the vessel, the apparatus further comprising:

a lid for opening and closing a garbage input port provided at an upper portion of said vessel;

an air blower actuated automatically in response to said lid being opened; and a hollow, perforated pipe of annular configuration mounted on an inside surface of a side wall of said vessel, said pipe communicating with said blower for conducting said air flow and including circumferentially distributed perforations arranged to direct respective streams of the air flow generally radially inwardly for establishing an air curtain.

2. The apparatus according to claim 1 wherein said pipe is arranged to direct said air flow across a cross section of said vessel.

* * * * *